(12) United States Patent
Takano et al.

(10) Patent No.: US 10,359,576 B2
(45) Date of Patent: Jul. 23, 2019

(54) SC LOW PROFILE CONNECTOR WITH OPTIONAL BOOT (71) Applicant: Senko Advanced Components, Inc., Marlborough, MA (US)

(72) Inventors: Kazuyoshi Takano, Southborough, MA (US); Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/624,302

(22) Filed: Jun. 15, 2017

(65) Prior Publication Data
US 2018/0364422 A1 Dec. 20, 2018

(51) Int. Cl.
*G02B 6/38* (2006.01)
(52) U.S. Cl.
CPC ......... *G02B 6/3825* (2013.01); *G02B 6/3831* (2013.01); *G02B 6/3887* (2013.01); *G02B 6/3893* (2013.01)
(58) Field of Classification Search
CPC .. G02B 6/3825; G02B 6/3893; G02B 6/3887; G02B 6/3831
See application file for complete search history.

(56) References Cited

U.S. PATENT DOCUMENTS

| 4,312,564 | A |   | 1/1982  | Cefarelli et al. |
|-----------|---|---|---------|------------------|
| 4,327,964 | A |   | 5/1982  | Haesly et al.    |
| 4,478,473 | A |   | 10/1984 | Frear            |
| 4,762,388 | A |   | 8/1988  | Tanaka et al.    |
| 4,764,129 | A |   | 8/1988  | Jones et al.     |
| 4,840,451 | A |   | 6/1989  | Sampson et al.   |
| 4,872,736 | A |   | 10/1989 | Myers et al.     |
| 4,979,792 | A |   | 12/1990 | Weber et al.     |
| 5,041,025 | A |   | 8/1991  | Haitmanek        |
| D323,143  | S |   | 1/1992  | Ohkura et al.    |
| 5,212,752 | A | * | 5/1993  | Stephenson .......... G02B 6/3831 385/139 |
| 5,265,181 | A |   | 11/1993 | Chang            |
| 5,289,554 | A |   | 2/1994  | Cubukciyan et al.|

(Continued)

FOREIGN PATENT DOCUMENTS

| CA | 2495693 A1 | 4/2004  |
|----|------------|---------|
| CN | 2836038 Y  | 11/2006 |

(Continued)

OTHER PUBLICATIONS

European Search Report and Written Opinion dated Mar. 3, 2015 for EP 14187661.

(Continued)

*Primary Examiner* — John Bedtelyon
(74) *Attorney, Agent, or Firm* — Edward S. Jarmolowicz, Esq.

(57) ABSTRACT

Low profile optical fiber connectors comprising a ferrule, a plug frame configured to receive the ferrule, and an outer housing configured to receive the plug frame. The outer housing may be configured to protrude less than about 2 mm from one end of an adapter when the low profile optical fiber connector is inserted into the adapter. The connector may include a boot sized such that the boot protrudes from the end of the adapter by less than about 15 mm.

7 Claims, 7 Drawing Sheets

(56) References Cited

U.S. PATENT DOCUMENTS

| | | |
|---|---|---|
| 5,317,663 A | 5/1994 | Beard et al. |
| 5,335,301 A | 8/1994 | Newman et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,636,424 B2 | 1/2014 | Kuffel et al. |
| 8,651,749 B2 | 2/2014 | Dainese Junior et al. |
| 8,770,863 B2 | 7/2014 | Cooke et al. |
| 9,411,110 B2 | 8/2016 | Barnette et al. |
| 9,494,744 B2 | 11/2016 | de Jong |
| 9,548,557 B2 | 1/2017 | Liu |
| 9,551,842 B2 | 1/2017 | Theuerkorn |
| 9,568,686 B2 | 2/2017 | Fewkes et al. |
| 9,581,768 B1 | 2/2017 | Baca et al. |
| 9,684,313 B2 | 6/2017 | Cline et al. |
| 2003/0053787 A1 | 3/2003 | Lee |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0290938 A1 | 11/2009 | Lin |
| 2010/0034502 A1 | 2/2010 | Lu et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0322825 A1 | 12/2013 | Cooke et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0219621 A1 | 8/2014 | Barnette et al. |
| 2014/0226946 A1 | 8/2014 | Cooke et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0301294 A1 | 10/2015 | Chang |

(56) References Cited

U.S. PATENT DOCUMENTS

| | | |
|---|---|---|
| 2015/0355417 A1 | 10/2015 | Takano |
| 2015/0331201 A1 | 11/2015 | Takano et al. |
| 2015/0378113 A1 | 12/2015 | Good et al. |
| 2016/0172852 A1 | 6/2016 | Takano |
| 2016/0291262 A1 | 6/2016 | Chang |
| 2016/0195682 A1 | 7/2016 | Takano |
| 2016/0266326 A1 | 9/2016 | Gniadek |
| 2016/0320572 A1 | 11/2016 | Gniadek |
| 2016/0131849 A1 | 12/2016 | Takano |
| 2017/0003458 A1 | 1/2017 | Gniadek |
| 2017/0254964 A1* | 9/2017 | Yajima .............. G02B 23/26 |
| 2018/0081127 A1* | 3/2018 | Coenegracht ....... G02B 6/3825 |

FOREIGN PATENT DOCUMENTS

| | | | |
|---|---|---|---|
| CN | 201383588 Y | 1/2010 | |
| CN | 202650189 U | 12/2013 | |
| DE | 202006011910 U1 | 3/2007 | |
| DE | 102006019335 A1 | 10/2007 | |
| EP | 1074868 A1 | 7/2001 | |
| EP | 1211537 A2 | 6/2002 | |
| EP | 1245980 A2 | 10/2002 | |
| EP | 1566674 A1 | 8/2005 | |
| GB | 2111240 A | 6/1983 | |
| JP | 2009229545 A | 10/2009 | |
| JP | 2009276493 A | 11/2009 | |
| TW | 200821653 A | 5/2008 | |
| WO | 2001/79904 A2 | 10/2001 | |
| WO | 2004/027485 A1 | 4/2004 | |
| WO | 2008/112986 A1 | 9/2008 | |
| WO | 2009/135787 A1 | 11/2009 | |
| WO | 2010/024851 A2 | 3/2010 | |
| WO | 2012/136702 A1 | 10/2012 | |
| WO | 2012/162385 A1 | 11/2012 | |
| WO | 2014/028527 A1 | 2/2014 | |
| WO | 2014/182351 A1 | 11/2014 | |
| WO | 2015/191024 A1 | 12/2015 | |
| WO | 2016/148741 A1 | 9/2016 | |

OTHER PUBLICATIONS

European Search Report and Written Opinion dated Feb. 19, 2015 for EP 14168005.

"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6IDVc_WYbr0QQ.

"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/Katalog¬Glenair¬LWL-1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Aug. 29, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

International Preliminary Report on Patentability dated Sep. 14, 2017 from related International Application No. PCT/US2015/059458, International Filing Date Nov. 6, 2015.

International Search Report (ISR) WO2008112986 dated Sep. 15, 2009.

ISR WO2012162385ISR Nov. 29, 2012.
ISR WO2014028527ISR Jul. 16, 2015.
ISR WO2015191024ISR Oct. 9, 2014.
ISR WO2015US57610ISR Sep. 22, 2016.
ISR WO2016176083ISR May 19, 2016.
ISR WO2016148741ISR Sep. 22, 2016.

* cited by examiner

SC LOW PROFILE CONNECTOR WITH OPTIONAL BOOT

BACKGROUND

The present disclosure relates generally to optical fiber connectors, and specifically to low profile optical fiber connectors.

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume, transmission speeds, and low losses. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device.

A conventional optical fiber connector has many constituent parts, including, for example, a spring. A conventional optical fiber connector that has many constituent parts results in a relatively large profile, and also necessitates more complex assembly and manufacturing processes. Accordingly, there is a need for optical fiber connectors, and specifically SC type optical fiber connectors, that have less parts and relatively low profile.

SUMMARY

Embodiments disclosed herein address the aforementioned shortcomings by providing optical fiber connectors that have relatively low profile. In some embodiments, a connector system may include an adapter. In various embodiments disclosed herein, low profile connectors may be achieved by providing connectors having less constituent components compared to prior art embodiments.

According to one aspect, there is provided a low profile optical fiber connector comprising a ferrule, a plug frame configured to receive the ferrule, and an outer housing configured to receive the plug frame, the outer housing being further configured to protrude less than about 2 mm from one end of an adapter when said low profile optical fiber connector is inserted into the adapter. The low profile optical fiber connector may be configured as an SC type connector. The ferrule may not be backed by a spring.

In some embodiments, the outer housing may comprise a plate configured to protrude from the end of the adapter by less than about 1.75 mm. In some embodiments, the plate may be chamfered.

In some embodiments, the low profile optical fiber connector may further comprise a custom sized boot. In some embodiments, the boot may be sized such that the boot protrudes from the end of the adapter by less than about 15 mm.

In some embodiments, the outer housing may include at least one opening and the plug frame may include at least one tab configured to couple to the at least one opening. In some embodiments, the outer housing may include a protrusion for coupling the outer housing to the adapter. In various embodiments, the ferrule may be coupled to a flange.

The foregoing, as well as additional objects, features and advantages of the present disclosure will be more apparent from the following detailed description, which proceeds with reference to the accompanying drawings.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors and/or electrical connectors therein to align and connect optical fibers end-to-end, or allow for pin/socket electrical connections.

Various embodiments of SC connectors may be used anywhere there is a need for high density arrays. Embodiments allow for many connectors to fit in a small space. In various embodiments, low-profile, small protrusion, SC style connectors allow for high density by using a low profile housing/plate that locks into an adapter by the use of "keys" or tabs. In some embodiments, the plate may be chamfered to be able to grab and pull back to release the connector from the adapter housing.

Figure 2:
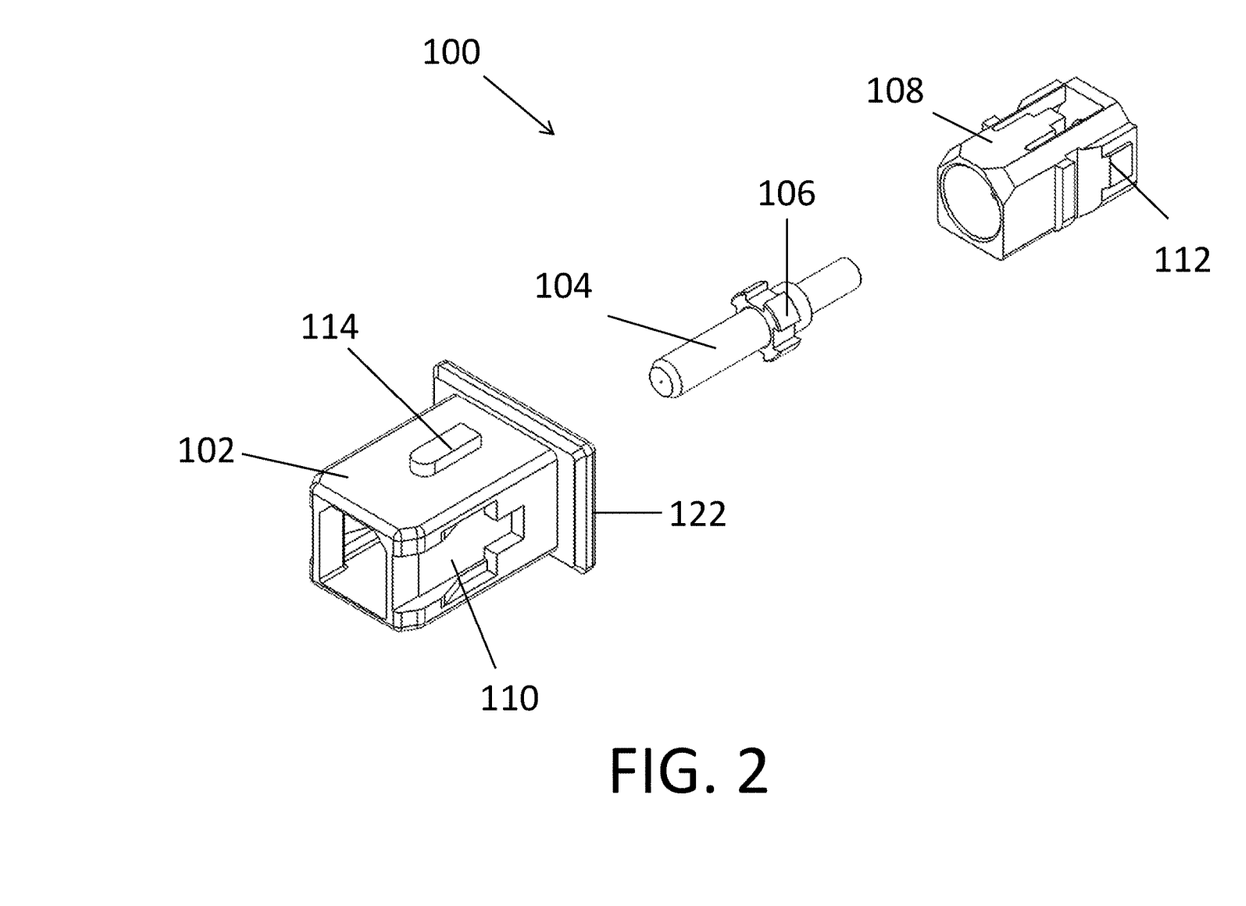
FIG. 2 is an exploded view of the optical fiber connector of FIG. 1 according to aspects of the present disclosure.
Figure 6:
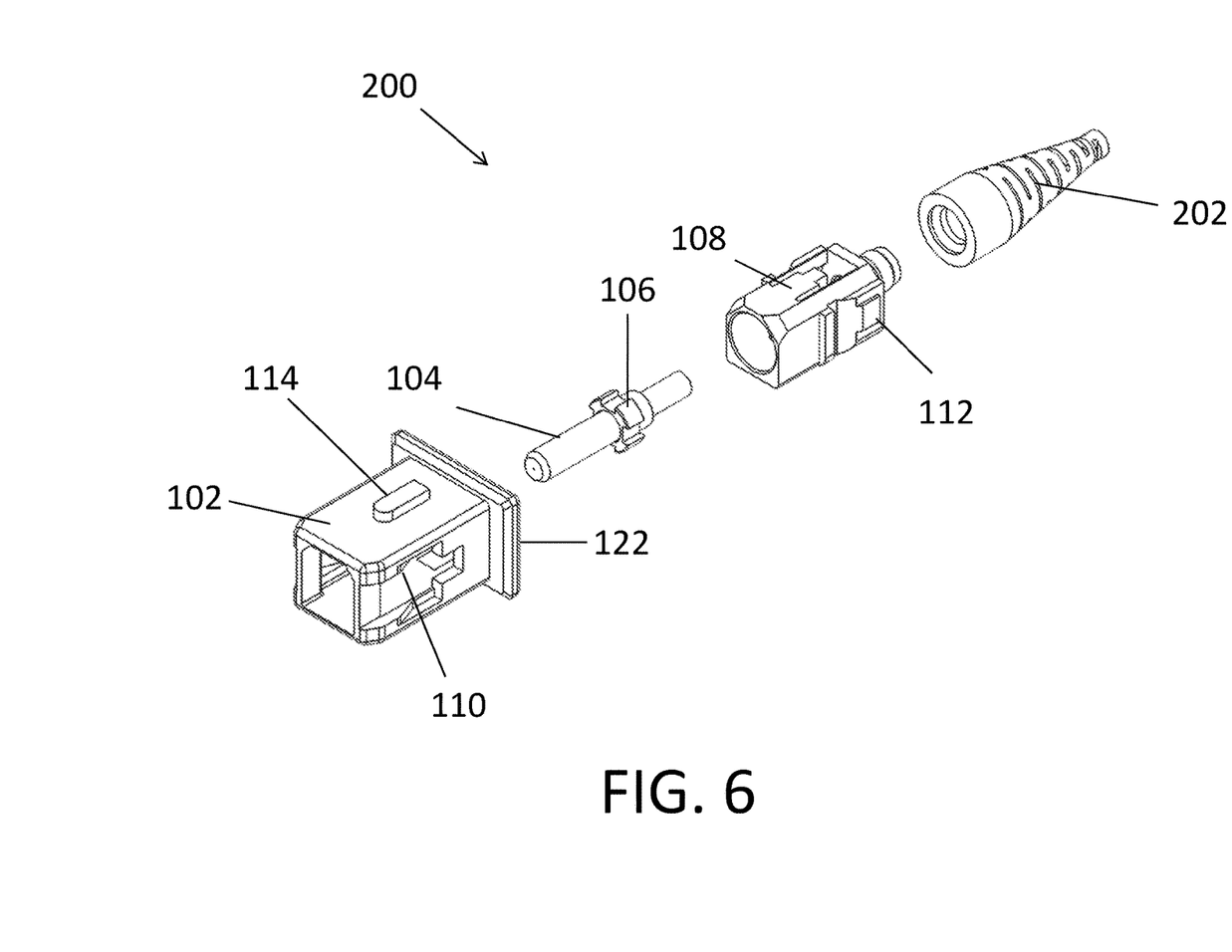
FIG. 6 is an exploded view of the optical fiber connector of FIG. 5 according to aspects of the present disclosure.

In various embodiments disclosed herein, low profile optical fiber connectors may be achieved by providing optical fiber connectors having less constituent components compared to prior art embodiments. For example, various embodiments disclosed herein need not use a spring as illustrated in FIGS. 2 and 6.

Various embodiments of connectors disclosed herein have less parts, and protrude only about 1.75 mm from the adapter. Some embodiments of optical fiber connectors have an optional custom sized boot. In some embodiments, the connector having the boot may extend about 14.25 mm past the end of the adapter, making less of a profile and being much shorter than existing connectors.

Various embodiments of optical fiber connectors are configured to work with existing standard or conventional SC adapters. Thus, consumers do not need to provide a special adapter to make the connection.

Various embodiments of optical fiber connectors disclosed herein achieve a low profile by having a smaller design and less parts, such as no spring, short protrusion from adapter, shorter back post, and custom boot.

Figure 1:
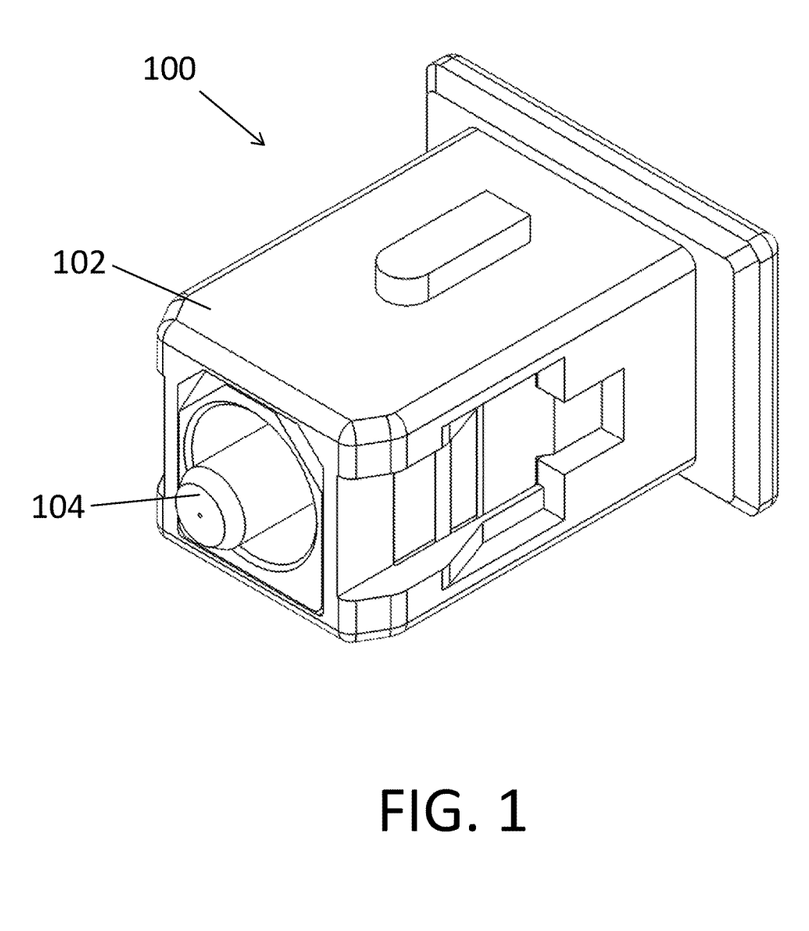
FIG. 1 is perspective view of one embodiment of an optical fiber connector configured according to aspects of the present disclosure.

FIG. 1 is perspective view of one embodiment of an optical fiber connector 100 having a low profile. FIG. 1 shows the connector 100 has an outer housing 102 and a ferrule 104. As shown in FIG. 2, the optical fiber connector 100 comprises an outer housing 102, a ferrule 104 coupled to a flange 106, and a plug frame 108. The plug frame 108 is configured to receive the ferrule 104 and the flange 106. The flange 106 is configured to couple to the plug frame 108. The outer housing 102 is configured to receive the plug frame 108 and to couple to it.

The outer housing 102 may include at least one opening 110, such as a side opening, configured to receive at least one tab 112 of the plug frame 108. The outer housing 102 may further include a protrusion 114 configured to engage a corresponding opening 116 of an adapter 120, as shown for example in FIG. 3. The outer housing 102 further includes a plate 122. The plate 122 may be chamfered to facilitate removal from the adapter 120.

Figure 3:
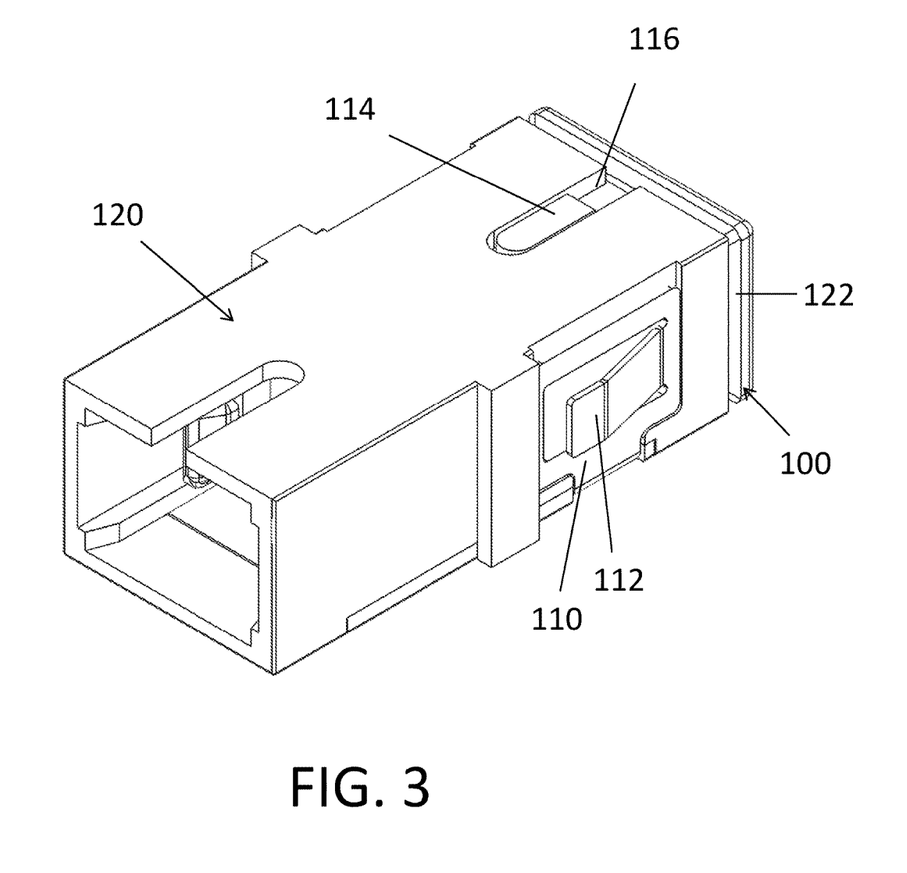
FIG. 3 is an perspective view of the optical fiber connector of FIG. 1 inserted into an adapter, according to aspects of the present disclosure.

FIG. 3 is an perspective view of the optical fiber connector of FIG. 1 inserted into an adapter 120, according to aspects of the present disclosure. As shown, the protrusion 114 engages an opening 116 of the adapter 120. The protrusion 114 is disposed at a top wall of the plug frame 108, and the corresponding opening 116 is also disposed at a top wall of the adapter 120. Further, the tab 112 of the plug frame 108 engages a corresponding opening 110 on a side wall of the adapter 120. The plate 122 is configured to rest against one end of the adapter 120, and may be chamfered to facilitate removal of the connector 100 from the adapter 120.

Figure 4:
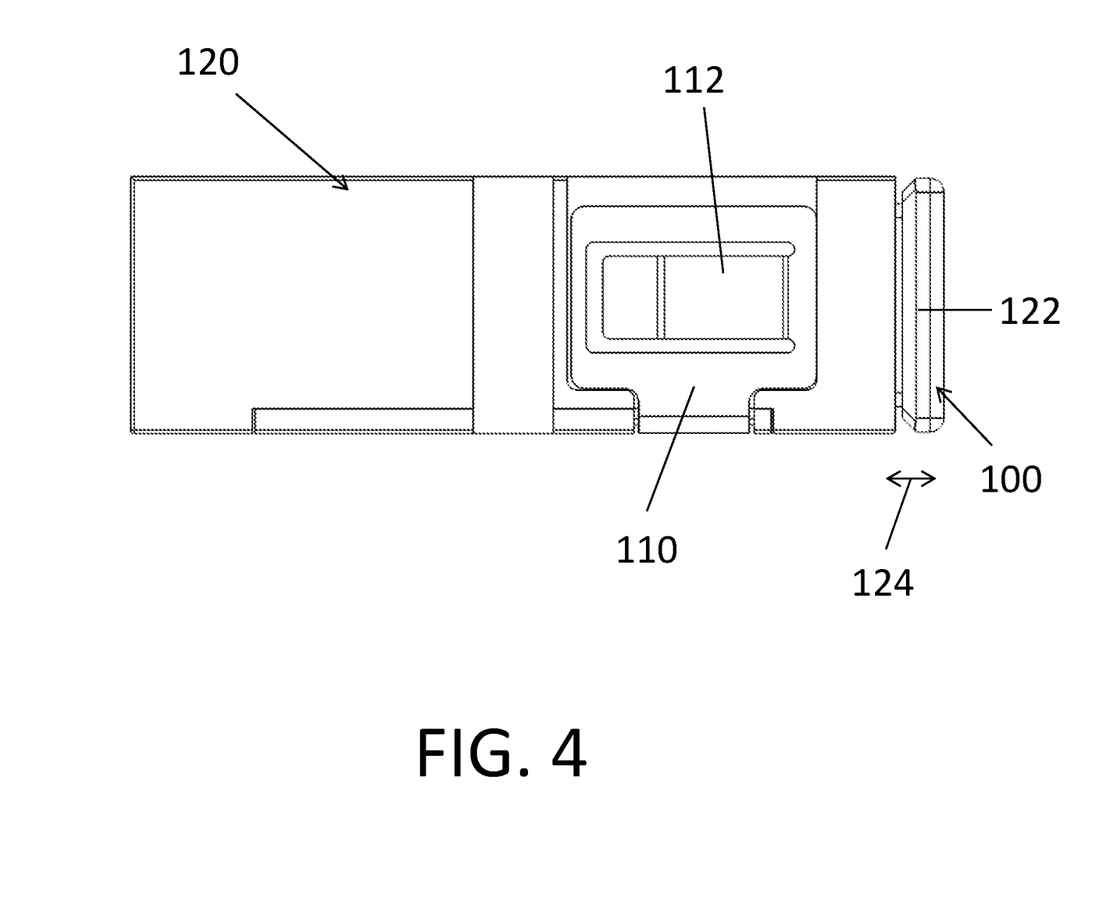
FIG. 4 is a side view of the connector and the adapter of FIG. 3 according to aspects of the present disclosure.

FIG. 4 is a side view of the connector 100 and the adapter 120 of FIG. 3 according to aspects of the present disclosure, further showing the chamfered plate 122, and the tab 112 of the plug frame 108 protruding from the opening 110 of the adapter. In this embodiment, the connector 100 protrudes only about 1.75 mm from the end of the adapter 120, as illustrated by the arrow 124. In various embodiments, the connector 100 may protrude less than or equal to about 2 mm from the end of the adapter 120.

Figure 5:
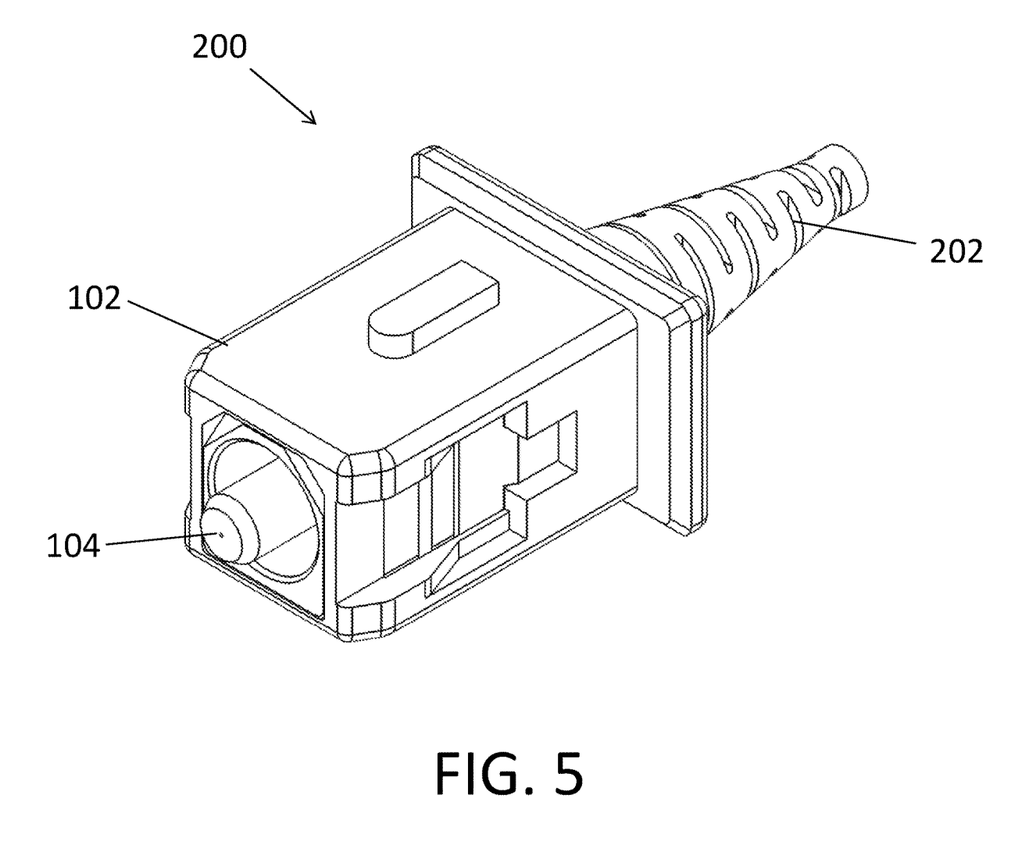
FIG. 5 is perspective view of another embodiment of an optical fiber connector having a boot and configured according to aspects of the present disclosure.

FIG. 5 is a perspective view of another embodiment of an optical fiber connector 200, further comprising a boot 202 and configured according to aspects of the present disclosure. FIG. 6 is an exploded view of the optical fiber connector 200 of FIG. 5. All the features described above in relation to the optical fiber connector 100 are also included in the optical fiber connector 200.

Figure 7:
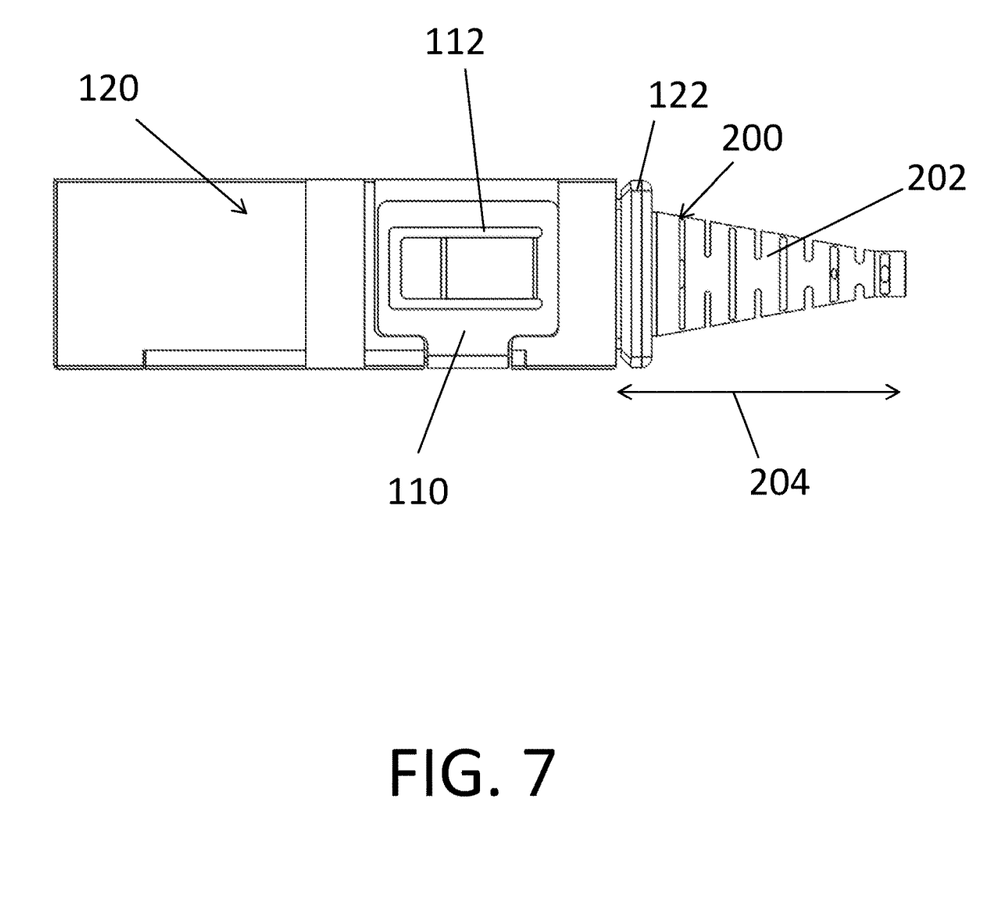
FIG. 7 is a side view of the fiber optic connector of FIG. 5 inserted into an adapter, according to aspects of the present disclosure.

FIG. 7 is a side view of the fiber optic connector 200 inserted into the adapter 120, according to aspects of the present disclosure. FIG. 7 shows the chamfered plate 122, and the tab 112 of the plug frame 108 protruding from the opening 110 of the adapter 120. FIG. 7 further shows the boot 202 having a custom size. In this embodiment, the connector 200 having the boot 202 extends about 14.25 mm past the end of the adapter 120, as illustrated by the arrow 204, making less of a profile and being much shorter than existing connectors. In various embodiments, the connector 200 with the boot 202 may protrude less than or equal to about 15 mm from the end of the adapter 120.

In various embodiments disclosed herein, the low profile optical fiber connectors may be configured as SC type connectors. In other embodiments, low profile optical fiber connectors may also be configured to provide other types of connections.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A low profile optical fiber connector assembly comprising:
   a ferrule with a plural of spaced apart flanges on outside of ferrule;
   a plug frame configured to receive the ferrule;
   wherein said flanges couple the ferrule within the plug frame; and
   an outer housing configured to receive and couple to the plug frame, wherein ferrule protrudes from a first end of outer housing, the assembly is free of any bias spring urging the ferrule to protrude from the end of the outer housing.

2. The low profile optical fiber connector of claim 1, being configured as an SC type connector.

3. The low profile optical fiber connector of claim 1, wherein the outer housing comprises a plate configured to protrude from the end of the adapter by less than about 1.75 mm.

4. The low profile optical fiber connector of claim 3, wherein the plate is chamfered.

5. The low profile optical fiber connector of claim 1, further comprising a custom sized boot.

6. The low profile optical fiber connector of claim 5, wherein the boot is sized such that the boot protrudes from the end of the adapter by less than about 15 mm.

7. The low profile optical fiber connector of claim 1, wherein the outer housing includes at least one opening and the plug frame includes at least one tab configured to couple to the at least one opening.

* * * * *